United States Patent [19]

Takizawa

[11] Patent Number: 4,743,064
[45] Date of Patent: May 10, 1988

[54] SEAT FOR A CHILD IN CAR
[75] Inventor: Yutaka Takizawa, Ayase, Japan
[73] Assignee: Ikeda Bussan Co., Ltd., Ayase, Japan
[21] Appl. No.: 17,244
[22] Filed: Feb. 20, 1987
[30] Foreign Application Priority Data Feb. 21, 1986 [JP] Japan ............................. 61-22966[U]

[51] Int. Cl.$^4$ ............................................. A47D 1/10
[52] U.S. Cl. ................................... 297/250; 297/377
[58] Field of Search ............... 297/250, 310, 325, 270, 297/377

[56] References Cited

U.S. PATENT DOCUMENTS

| 169,772 | 11/1875 | Cadwallader | 297/270 X |
|---|---|---|---|
| 2,324,421 | 7/1943 | Ouellette | 297/310 |
| 2,482,306 | 9/1949 | Waldheim | 297/325 X |
| 2,605,815 | 8/1952 | Zoranovich | 297/250 |
| 3,794,379 | 2/1974 | Furey | 297/250 |
| 4,113,306 | 9/1978 | von Wimmersperg | 297/250 |
| 4,186,962 | 2/1980 | Meeker | 297/250 |
| 4,500,133 | 2/1985 | Nakao et al. | 297/250 |
| 4,613,188 | 9/1986 | Tsuge et al. | 297/250 |

Primary Examiner—Francis K. Zugel
Attorney, Agent, or Firm—Foley & Lardner, Schwartz, Jeffery, Schwaab, Mack, Blumenthal & Evans

[57] ABSTRACT

A seat for a child in car comprising a seat portion and a back portion and capable of being mounted on a car seat by mean of a seat belt with its backside directed forward. It is also provided with an auxiliary support collapsible into the underside of its seat portion.

4 Claims, 3 Drawing Sheets

SEAT FOR A CHILD IN CAR

BACKGROUND OF THE INVENTION (1.) Field of the Invention

The present invention relates to a seat for a child in a car, and, more particularly, it relates to a child's seat which can be mounted, backside front, on any of the seats in the car by means of the seat belt.

(2.) Prior Art

FIG. 1 shows one of the conventional child's seats which can be mounted on a seat in the car, with its backside directed forward. This child's seat 1 comprises a seat 2 and a back 3 having side supports 4 on both sides. In the case of a child nine or less months old, the child's seat is mounted on the seat in the car, with its backside directed forward, while it is mounted with its front side directed forward in the case of an older child. When it is to be mounted on a front seat in the car, with its backside forward, its back bottom corner 1a is mounted on a seat cushion 6 of the seat 5, its front bottom corner 2a is rested on a back 7 of the seat 5, its upper corner 3a of the back 3 is leaned on the dashboard 8 of the car, and it is then fixed by the seat belt 9 passing through holes 10, as shown in FIG. 1. In the case where it is mounted on a rear seat, with its backside forward, its upper corner 3a is rested on the back of the front seat.

When the car crashes against something from behind with this child's seat mounted therein, however, the child's seat 1 is at first subjected to a moment which is in the direction of arrow A taking the back bottom corner 1a as its center, but it is then subjected to another moment which is in the direction of arrow B, as shown in FIG. 2. This is bound to throw the child onto the back of the seat in the car. This is extremely dangerous.

SUMMARY OF THE INVENTION

The object of the present invention is therefore to provide a safety child's seat for use in cars capable of avoiding the above-mentioned danger.

A child's seat according to the present invention is provided with an auxiliary support collapsible into the underside of the seat.

When the child's seat is to be mounted with its backside forward in the car, the auxiliary support is pulled out and rested on the seat cushion of the car seat. Even if the car should crash against something from behind, the auxiliary support can function as a stopper, thereby preventing the child's seat from being propelled rearwardly.

According to the present invention, the seat for a child in car is provided with an auxiliary support collapsible into the underside of the car seat. When the child's seat is to be mounted on the car seat with its backside forward, therefore, auxiliary support is pulled out and used to function as a stopper in the case where the car should crash against something from behind, thereby preventing the child's seat from being propelled rearwardly and enabling the child in it to safely be protected. When not used, the auxiliary support can be collapsed and housed into the underside of the child's seat.

Some embodiments of the present invention will be described in detail with reference to the accompanying drawings.

DETAILED DESCRIPTION OF THE PREFERRED EMBODIMENTS

Figure 1:
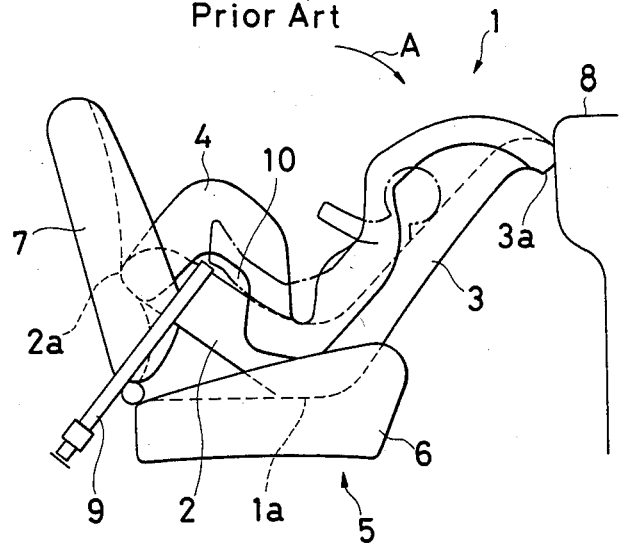
FIG. 1 is a side view showing the conventional child's seat mounted on a seat in the car with its backside directed forward.
Figure 2:
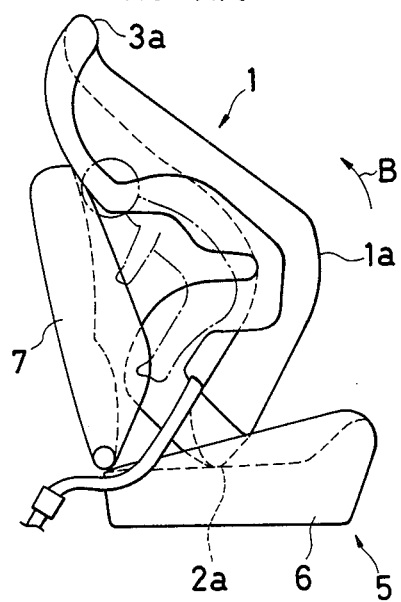
FIG. 2 is a side view showing the child's seat at the time when the car crashes against something from behind.
Figure 3:
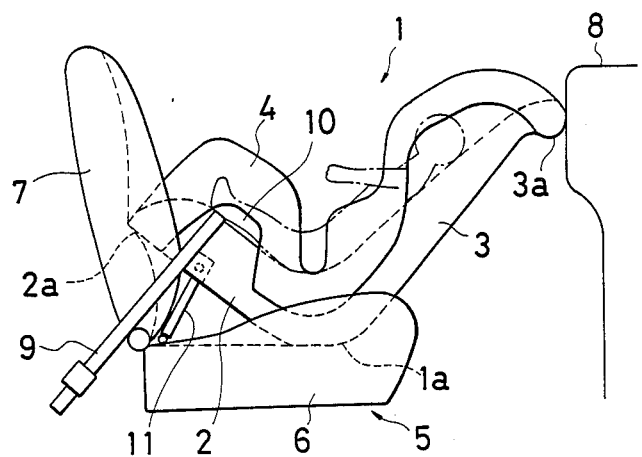
FIG. 3 is a side view showing an example of the child's seat according to the present invention which is mounted on a seat in the car with its backside forward.

FIG. 3 shows an embodiment of the present invention. A child's seat 1 comprises a seat portion 2 and a back portion 3 having side support 4 on both sides thereof. In the case where this child's seat is used on a front seat 5 in the car with its backside directed forward, an auxiliary support 11 which can be collapsed and housed into the underside of the seat portion 2 of the child's seat 1 is pulled out, a back bottom corner 1a of the child's seat 1 is rested on a cushion seat 6 of the front car seat 5, a front bottom corner 2a thereof is rested on a back 7 of the front car seat 5, and an upper corner 3a of the back portion 3 thereof is rested on a dashboard 8 of the car. The child's seat 1 thus positioned is then fixed by a seat belt 9 passing through holes 10.

Figure 4:
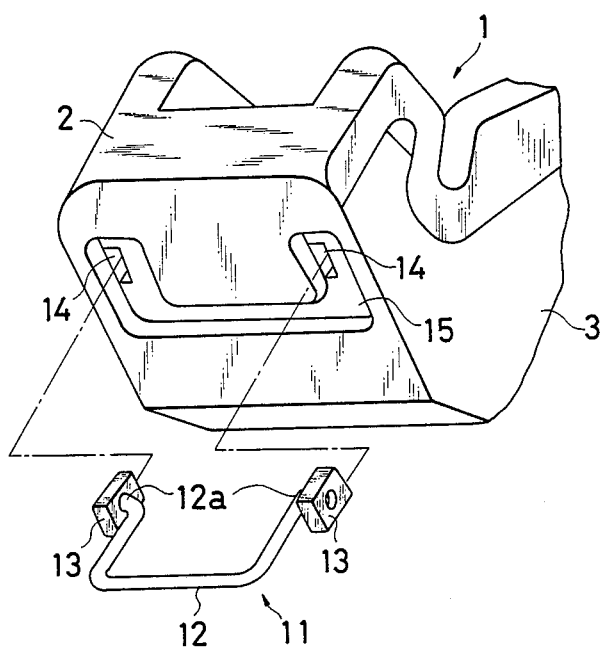
FIG. 4 is a perspective view showing the underside of the child's seat in FIG. 3 and an auxiliary support disassembled from the child's seat.

As shown in FIG. 4, the auxiliary support 11 includes a U-shaped pipe 12 whose both ends are bent outward, respectively, and brackets 13 each supporting one of these bent ends and being arranged in a hole 14 provided in the underside of the seat portion 2 of the child's seat 1. The underside of the seat portion 2 is provided with a recess 15, substantially the same in shape as the pipe 12, for housing the brackets 13 and pipe 12 of the auxiliary support 11 so that they do not project from the underside of the seat portion 2 when these brackets 13 and pipe 12 are collapsed.

Figure 5:
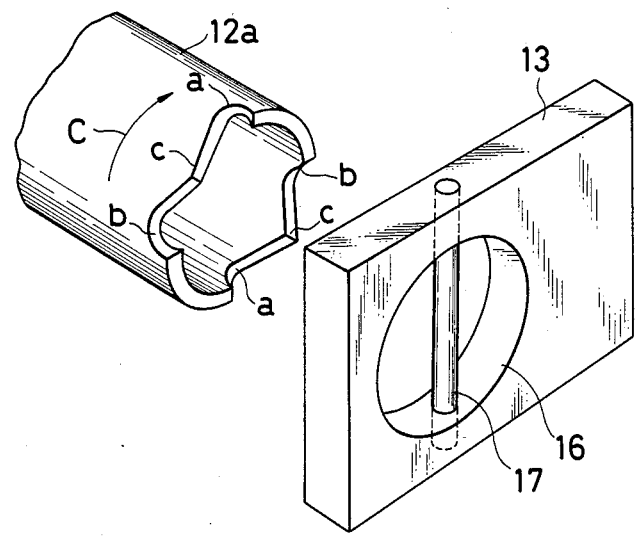
FIG. 5 is a perspective view showing an end of a pipe and a bracket in the case of the auxiliary support shown in FIG. 4.

Each end face of ends 12a of the pipe 12 is provided with valleys or detents (a) and (b) formed in those directions perpendicular to each other and an elevation (c) formed between the valleys (a) and (b), rising from them, as shown in FIG. 5. Each of the brackets 13 is provided with a bore 16 into which the end 12a of the pipe 12 can be inserted. A pin 17 is pressed into the bracket 13, radially crossing the bore 16 through the center thereof. The end face of the pipe end 12a is resiliently pressed against the pin 17 and its valleys (a) are pressed against the pin 17 when the auxiliary support is housed. When the pipe 12 is turned in the clockwise direction C in FIG. 5 upon using the auxiliary support 11, the pin 17 travels on the end face of the pipe end 12a from the valleys (a) to the elevations (c) thereof and then clickingly falls into the other valleys (b) to be held there.

Figure 6:
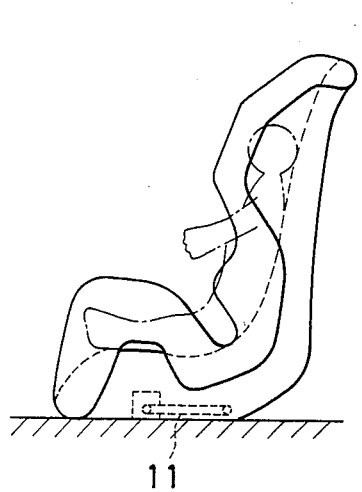
FIG. 6 a side view showing the child's seat in FIG. 3 used under another condition.
Figure 7:
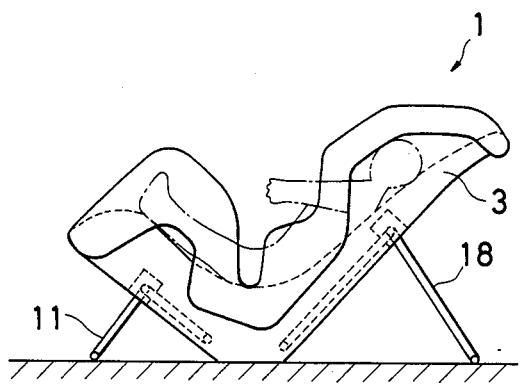
FIG. 7 is a side view showing another embodiment of the present invention.

The child's seat can be mounted on a car seat with its front side directed forward, as seen in the conventional cases. When it is used like this, it may keep its auxiliary support housed or pulled out. Further, it may be stood in the car, with its auxiliary support 11 housed, as shown in FIG. 6. Furthermore, another auxiliary support 18 may be attached to the back portion 3 of the child's seat, which may be used in a reclining manner with the auxiliary supports 11 and 18 pulled out, as shown in FIG. 7.

What is claimed is:

1. A seat for a child in car comprising:
   a seat portion;
   a back portion attached at an angle to the seat portion;
   side supports arranged on both sides of these seat and back portions; and
   a first auxiliary support, including means for pivoting the support about the underside of the seat portion so that it is collapsible from an erected position to a housed position on the underside of the seat portion;
   means for mounting the child's seat on a car seat with its backside directed forward and with it being supported with said first auxiliary support in the erected position rested on the car seat to prevent rotation of the seat in a rearward direction; wherein
   each of said side supports projects from an upper surface of the seat portion to define a pair of respective through-holes between the upper surface of the seat portion and the lower side of each of the side supports for passing a seat belt for the car seat through said through-holes to fix the child's seat onto the car seat; and
   underside of the seat portion includes a recess into which the first auxiliary support can be housed in its housed position, whereby the first auxiliary support can be pivoted into and out of the recess.

2. A seat according to claim 1, further comprising a second auxiliary support including means for pivoting said second auxiliary support about the rear side of said back portion so that it is collapsible from an erected position to a housed position on the rear side of the back portion.

3. A seat according to claim 1, wherein said first auxiliary support is generally U-shaped and is pivotally attached to said seat portion at the distal ends of its U-legs.

4. A seat according to claim 1, wherein said pivoting means includes means for locking the first auxiliary support in the erected position.

* * * * *